US011940111B2

(12) United States Patent
Yu

(10) Patent No.: US 11,940,111 B2
(45) Date of Patent: Mar. 26, 2024

(54) LAMP FOR VEHICLE

(71) Applicant: HYUNDAI MOBIS CO., LTD., Seoul (KR)

(72) Inventor: Han Seong Yu, Yongin-si (KR)

(73) Assignee: Hyundai Mobis Co. Ltd., Seoul (KR)

( * ) Notice: Subject to any disclaimer, the term of this patent is extended or adjusted under 35 U.S.C. 154(b) by 0 days.

(21) Appl. No.: 17/647,836

(22) Filed: Jan. 12, 2022

(65) Prior Publication Data

US 2022/0243886 A1 Aug. 4, 2022

(30) Foreign Application Priority Data

Jan. 29, 2021 (KR) ........................ 10-2021-0013580

(51) Int. Cl.

*F21S 41/19* (2018.01)
*F21S 41/153* (2018.01)
*F21S 45/43* (2018.01)
*F21S 45/49* (2018.01)

(52) U.S. Cl.

CPC ........... *F21S 41/192* (2018.01); *F21S 41/153* (2018.01); *F21S 45/43* (2018.01); *F21S 45/49* (2018.01)

(58) Field of Classification Search

CPC ........ F21S 41/192; F21S 41/153; F21S 45/43; F21S 45/49; H05B 45/345; H05B 45/3577; H05B 45/3725; H05B 45/56

See application file for complete search history.

(56) References Cited

U.S. PATENT DOCUMENTS 4,159,442 A * 6/1979 Komatsu ............ H03K 17/7955 315/156
4,398,139 A * 8/1983 Prinsze ................. H02J 7/0047 362/183
5,150,016 A * 9/1992 Sawase ............... H01L 25/0753 315/192
6,299,337 B1 * 10/2001 Bachl ...................... F21V 29/89 362/545

(Continued)

FOREIGN PATENT DOCUMENTS

CN 2417066 Y * 1/2001
CN 103052838 A * 4/2013 ............. F21K 9/135

(Continued)

OTHER PUBLICATIONS

Search English translation of JP 2008509523 A (Year: 2006).*
Search English translation of CN 2417066 Y (Year: 2001).*
Dictionary of Electronics, E.C. Young, p. 521 (Year: 1988).*

*Primary Examiner* — Omar Rojas Cadima
(74) *Attorney, Agent, or Firm* — DLA Piper LLP (US)

(57) ABSTRACT

A lamp for a vehicle includes a board device including a first mounting part and a second mounting part bent and extending from the first mounting part, a light source device mounted on the first mounting part and including a plurality of light sources, and a light source controller mounted on the second mounting part, and electrically connected to the plurality of light sources to control a current flowing through the plurality of light source. The board device further includes a bending device formed at a portion at which the first mounting part and the second mounting part meet each other, and formed to be bent, such that a specific angle is formed between the first bending part and the second bending part.

11 Claims, 4 Drawing Sheets

(56) References Cited

U.S. PATENT DOCUMENTS

| | | | | |
|---|---|---|---|---|
| 7,710,050 | B2 * | 5/2010 | Preston | H05B 45/18 315/307 |
| 2009/0302730 | A1 * | 12/2009 | Carroll | F21V 29/70 313/317 |
| 2010/0270923 | A1 * | 10/2010 | Froehlich | H05K 1/0278 315/32 |
| 2012/0182753 | A1 * | 7/2012 | Otsubo | F21K 9/23 362/544 |
| 2014/0292192 | A1 * | 10/2014 | Rodinger | H05B 45/56 315/32 |
| 2018/0156407 | A1 * | 6/2018 | Lee | F21S 43/19 |

FOREIGN PATENT DOCUMENTS

| | | | | |
|---|---|---|---|---|
| EP | 1322139 | A1 * | 6/2003 | H05B 33/0815 |
| EP | 3163979 | B1 * | 12/2020 | H05B 45/395 |
| JP | 2008509523 | A * | 2/2006 | |

* cited by examiner

LAMP FOR VEHICLE

CROSS-REFERENCE TO RELATED APPLICATION

This application claims the benefit of priority to Korean Patent Application No. 10-2021-0013580, filed in the Korean Intellectual Property Office on Jan. 29, 2021, the entire contents of which are incorporated herein by reference.

TECHNICAL FIELD

The present disclosure relates to a lamp for a vehicle, and more particularly to a lamp for a vehicle, capable of improving EMC performance and heat dissipation performance, and of being realized in slim size.

BACKGROUND

In general, a headlamp for a vehicle is a vehicle mounted on a front surface of a vehicle to illuminate the front of the vehicle in night driving, such that the vehicle safely travels. Recently, development has been performed regarding an intelligence lamp system to perform illuminating, based on a road condition and a surrounding environment.

An adaptive driving beam (ADB) system, which is a kind of the intelligence lamp, is a system developed by combining advantages of a glare-free low beam and advantages of a high beam for ensuring the sight of a driver. The ADB system may adjust an illuminating angle of a lamp to form a dark zone in a space for another vehicle, thereby preventing glare, when the vehicle is sensed in front, during traveling while forming a high-beam pattern.

A matrix-type ADB system selectively turns on or turns off a plurality of light emitting diode (LED) light sources to block light in a local area, such that a dark zone is formed. In this case, the headlamp may include an LED array module including the plurality of LED light sources and an LED drive module to drive/control the LED light sources, such that the LED light sources are selectively turned on or turned off. The LED drive module may include an integrated circuit (IC) including devices to drive/control the LED light sources.

Conventionally, the headlamp has employed a separate board type in which the LED array module and the LED drive module are mounted on separate boards and electrically connected to each other through a cable. However, recently, the headlamp has been developed in an integral board type in which the IDC is mounted in the LED array module, without the separate board.

However, according to the integral board type, the IC embedded therein with devices is mounted around the LED light source to cause an electro-magnetic compatibility (EMC) problem due to a switching noise. In detail, when a switching circuit device is included, a cover to shield an electromagnetic wave should be placed. However, the interference is caused by an optical mechanism, such as a lens, mounted in the LED array module, which makes it difficult to place the shielding cover.

In addition, according to the conventional integral board type, heat may be transferred from the LED to the IC. Further, the size of the board is increased to mount the IC on the integral board, and thus the size of a fixing mechanism to fix the board is increased, which makes it difficult to realize a slim headlamp.

Accordingly, a lamp system for a vehicle is necessary to maintain an integral board form and improve EMC performance and heat dissipation performance while realizing a slim headlamp.

SUMMARY

The present disclosure has been made to solve the above-mentioned problems occurring in the prior art while advantages achieved by the prior art are maintained intact.

An aspect of the present disclosure provides a lamp for a vehicle, capable of minimizing the interference between a light source device and a light source controller, by spacing an area for mounting the light source device apart from an area for mounting the light source controller, as a first mounting part and a second mounting part are provided to form a specific angle on a board device through a bending device formed on the board device.

Another aspect of the present disclosure provides a lamp for a vehicle, capable of mounting a shielding member on a second mounting part, while maintaining an integral board form in which a light source device and a light source controller are mounted in one board.

Another aspect of the present disclosure provides a lamp for a vehicle, capable of solving a problem of transferring heat from a light source to a light source controller and being realized in a slim structure.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a lamp for a vehicle may include a board device including a first mounting part and a second mounting part bent and extending from the first mounting part, a light source device mounted on the first mounting part and including a plurality of light sources, and a light source controller mounted on the second mounting part, and electrically connected to the plurality of light sources to control a current flowing through the plurality of light sources. The board device may further include a bending device formed at a portion at which the first mounting part and the second mounting part meet, and formed to be bent such that a specific angle is formed between the first bending part and the second bending part.

The first mounting part, the second mounting part, and the bending part may be integrally formed.

The board device may include a connection circuit pattern which is formed in the bending device and provided to electrically connect the plurality of light sources, which are provided in the light source device, to a plurality of control devices which are provided in the light source controller.

The plurality of light sources may be connected to each other in series, and the plurality of control devices may be connected to the plurality of light sources in parallel, respectively, to bypass currents flowing through the light sources.

The lamp may further include a shielding cover mounted on the second mounting part to cover the light source controller and to shield an electromagnetic wave.

A plurality of bending devices may be provided at an edge of the first mounting part, a plurality of second mounting parts may be provided to correspond to the plurality of bending devices, and a plurality of light source controller may be provided to correspond to the plurality of second mounting parts, such that a plurality of control devices are distributed and mounted in the plurality of second mounting parts.

The second mounting part may include second up-down mounting parts bent and extending from an upper end portion and a lower end portion of the first mounting part, and second left-right mounting parts bent and extending from side end portions of the first mounting part. The light source controller may include a first light source controller, which is mounted on the second up-down mounting part and electrically connected to the light source device, and a second light source controller which is mounted on the second left-right mounting part and electrically connected to the light source device.

The first mounting part may include a metal material.

The second mounting part may include a glass fiber material.

The second mounting part may include a metal material.

The lamp may further include a heat sink device provided to make contact with the first mounting part and the second mounting part and to receive heat from the first mounting part and the second mounting part, and a cooling fan mounted at one side of the heat sink device to form the flow of air and to cool the heat sink device.

The cooling fan may be mounted on a surface, which faces a direction opposite to a direction of the first mounting part, of the heat sink device.

As described above, according to an embodiment of the present disclosure, the vehicle lamp may include the first mounting part and the second mounting part forming a specific angle on the board device by the bending device formed on the board device, thereby minimizing the interface between the area for mounting the light source part and the area for mounting the light source controller.

Therefore, according to an embodiment of the present disclosure, the integral-board form is maintained in which the light source device and the light source controller are mounted on one board, and the light source device is spaced apart from the light source controller. Accordingly, the member necessary for shielding may be mounted on the second mounting part, thereby improving the EMC.

In addition, according to an embodiment of the present disclosure, the light source device and the light source controller may be spaced apart from each other to solve the problem of transferring heat from the light source to the light source controller.

In addition, according to an embodiment of the present disclosure, since additional equipment is not required for the EMC and for blocking heat, the slim vehicle lamp may be realized.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described with reference to accompanying drawings.

Embodiments to be described below are embodiments appropriate to allow those skilled in the art to understand technical features of a lamp for a vehicle, e according to the present disclosure. However, the present disclosure or the features of the present disclosure is not limited to embodiments to be described below, and various modifications are possible within the technical scope of the present disclosure.

Figure 1:
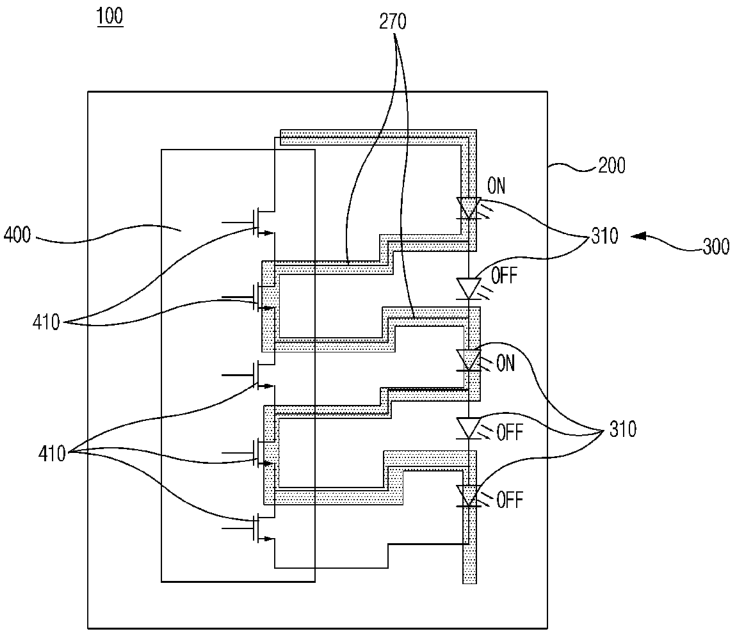
FIG. 1 is a view schematically illustrating the configuration of a lamp for a vehicle, according to an embodiment of the present disclosure.
Figure 2:
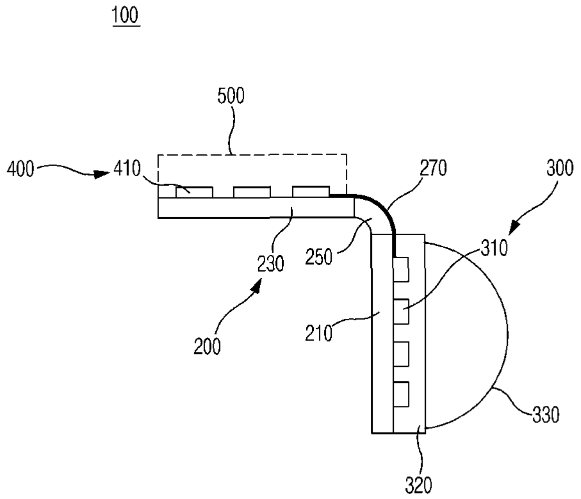
FIG. 2 schematically illustrates a lamp for a vehicle, according to an embodiment of the present disclosure, in which a bending device is formed on a board device.
Figure 3:
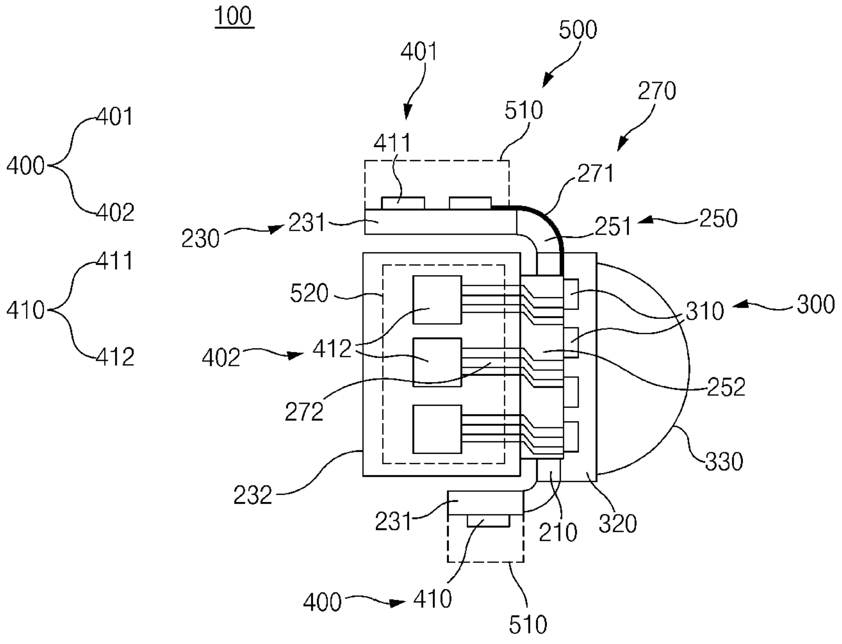
FIG. 3 illustrates a lamp for a vehicle, according to another embodiment of the present disclosure, in which a plurality of second mounting parts are provided.
Figure 4:
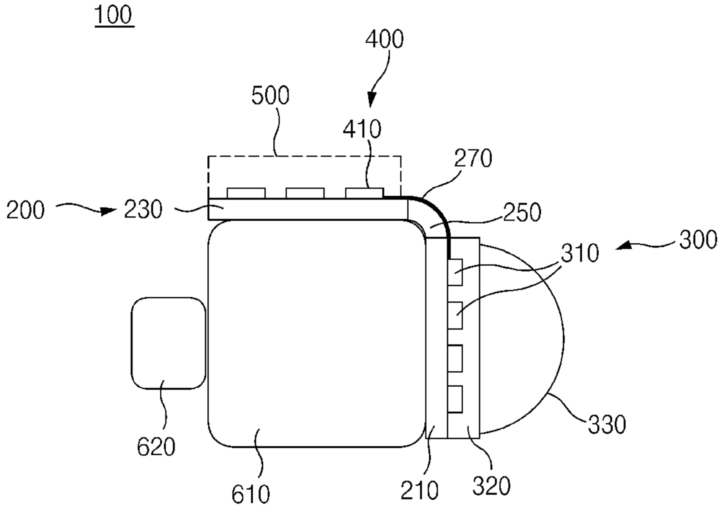
FIG. 4 illustrates a lamp for a vehicle including a heat sink device and a cooling fan, according to another embodiment of the present disclosure.

FIG. 1 is a view schematically illustrating the configuration of a lamp for a vehicle, according to an embodiment of the present disclosure, FIG. 2 schematically illustrates a lamp for a vehicle, according to an embodiment of the present disclosure, in which a bending device is formed on a board device, and FIG. 3 illustrates a lamp for a vehicle, according to another embodiment of the present disclosure, in which a plurality of second mounting parts are provided. FIG. 4 illustrates a lamp for a vehicle, which includes a heat sink device and a cooling fan, according to another embodiment of the present disclosure.

According to an embodiment of the present disclosure, a vehicle lamp 100 for a vehicle may include various types of lamps mounted in the vehicle. For example, according to an embodiment of the present disclosure, the vehicle lamp 100 may be an intelligent lamp to adjust the illuminating angle of the lamp or an on/off state of the light sources 310, when another vehicle is sensed in front, during driving, thereby preventing the glare of the another vehicle. For example, the vehicle lamp 100 may be a vehicle lamp using an ADB system. The following description will be made, by way of example, regarding the vehicle lamp 100 including a plurality of light sources 310 selectively turned on or turned off according to an embodiment of the present disclosure. However, the vehicle lamp 100 according to the present disclosure is not limited to the above case, and various types of lamp 100 for the vehicle may be applied.

Referring to FIGS. 1 and 4, according to an embodiment of the present disclosure, the vehicle lamp 100 may include a board device 200, a light source part 300, a light source controller 400, and a bending device 250.

The board device 200 includes a first mounting part 210 and a second mounting part 230 bent and extending from the first mounting part 210

In more detail, the board device 200 may be a printed circuit board (PCB) to mount the light source device 300 and the light source controller 400 on the PCB. The first mounting part 210 and the second mounting part 230 may be divided from each other on the board device 200, the second mounting part 230, which is integrally formed with the first mounting part 210, may be bent and extend from the first mounting part 210.

The board device 200 further includes the bending device 250. The bending device 250 may be formed at a portion at which the first mounting part 210 and the second mounting part 230 meet, and may be bent to form a specific angle between the first mounting part 210 and the second mounting part 230.

The light source device 300 is mounted on the first mounting part 210 and includes a plurality of light sources 310. The light source device 300 may be a light emitting diode (LED) serving as a semiconductor light emitting element, and a plurality of LEDs may be mounted on the PCB. For example, the vehicle lamp 100 according to an embodiment of the present disclosure may be an ADB type headlamp, or may be a matrix-type lamp which forms a dark zone in a specific area in front by selectively turning on or turning off the plurality of light sources 310. In this case, the plurality of light sources 310 may be disposed in the first mounting part 210 at predetermined distances, and even a circuit to drive the plurality of light sources 310 may be disposed together with the light sources 310.

The light source controller 400 includes a control device 410 which is mounted on the second mounting part 230 and electrically connected to the plurality of light sources 310 to control a current flowing through the plurality of light sources 310.

In more detail, an electrode and a circuit pattern are formed on a thin plate including copper (Cu) in the board device 200, and the LED serving as a light source and the control devices 410 may be disposed on the circuit pattern. The light source 310 may emit light by the current which is applied. In this case, the control devices 410 may control the flow of the current through the light source 310, such that some of the plurality of light sources 310 are turned on or turned off.

In addition, the first mounting part 210, the second mounting part 230, and the bending device 250 may be integrally formed In detail, the first mounting part 210, the bending device 250, and the second mounting part 230 may be integrally formed to form a single board. The bending device 250 may have one end portion connected to the first mounting part 210 and an opposite end connected to the second mounting part 230, and may have a portion bent between the one end portion and the opposite end portion of the bending device 250. The second mounting part 230 may be bent and extend from the first mounting part 210 through the bending device 250. For example, the first mounting part 210, the second mounting part 230, and the bending device 250 may be formed by bending one board, or may be integrally formed, as plates including different materials are bonded to each other. In other words, the first mounting part 210, the second mounting part 230, and the bending device 250 may have a layer structure.

The first mounting part 210 and the second mounting part 230 may be formed to form a specific angle through such a bending device 250. Accordingly, the light source part 300 mounted on the first mounting part 210 may be spaced apart from the light source controller 400 mounted on the second mounting part 230. In other words, as the light source device 300 and the light source controller 400 are mounted through the single board, an additional board for the light source controller 400 is not required, and the light source device 300 may be spaced apart from the light source controller 400 by a specific distance. In this case, the angle of the bending device 250 may be an angle at which the first mounting part 210 and the second mounting part 230 may be appropriately disposed in consideration of the design specification of the vehicle lamp 100, the light source device 300, and the light source controller 400. FIGS. 2 and 4 illustrate that the angle of the bending device 250 is formed at about 90 degrees.

As described above, according to an embodiment of the present disclosure, interference between an area for mounting the light source device 300 and an area for mounting for the light source controller 400 may be minimized, as the first mounting part 210 and the second mounting part 230 are not placed on the same plate of the board device 200 by the bending device 250. Therefore, according to the present disclosure, a member necessary for shielding static electricity may be mounted on the second mounting part 230 for electromagnetic compatibility (EMC), and the transfer of heat from the light source device 300 to the light source controller 400 may be minimized. In addition, according to an embodiment of the present disclosure, since additional equipment is not required for the EMC and for blocking heat, the slim vehicle lamp 100 may be realized.

In detail, referring to FIGS. 2 and 3, a shielding cover 500 mounted on the second mounting part 230 to cover the light source controller 400 and provided to shield electromagnetic waves may be further included.

The shielding cover 500 may be provided to cover a device, such as the control device 410, which generates electromagnetic waves, mounted on the second mounting part 230, and may be mounted on the second mounting part 230. The shielding cover 500 may include a material having excellent permeability, and may cover the peripheral portion of the light source controller 400, such that a magnetic field flows through the outer surface of the shielding cover 500.

According to an embodiment, the vehicle lamp 100 may include a fixing member 320, which fixes the light source device 300, to the first mounting part 210, and a lens structure 330 which is disposed in front of the light source device 300. According to an embodiment of the present disclosure, the bending device 250 is formed in the board device 200, thereby minimizing the interface between the fixing member 320 and the lens structure 330, when the shielding cover 500 is placed. Therefore, the EMC may be improved.

For example, when the bending device 250 is not formed on the board device 200, the light source 310 and the control device 410 are disposed to be adjacent to each other. Accordingly, the shielding cover 500 may not be placed due to the fixing member 320 or the lens structure 330. According to the present disclosure, the bending device 250 is formed on the board device 200, and the light source device 300 is spaced apart from the light source controller 400 without increasing the size of the board device 200, thereby solving the above problem.

Meanwhile, referring to FIG. 2, the board device 200 may include a connection circuit pattern 270. The connection circuit pattern 270 may be formed in the bending device 250 and may be provided to electrically connect the plurality of light sources 310 provided in the light source device 300 to a plurality of control devices 410 provided in the light source controller 400.

In detail, the connection circuit pattern 270, serves as a portion of a circuit pattern formed of a thin plate including Cu and formed on the PCB, may be a circuit pattern to connect the light sources 310 and the control device 410. Conventionally, when the light source device 300 and the light source controller 400 are mounted on an additional board, an additional cable is placed at a connection part between boards for the electrical connection. Accordingly, the number of parts is increased, and an additional space is required. Meanwhile, according to an embodiment of the present disclosure, an integral-type board is used as the board device 200, the light source device 300 may be electrically connected to the light source controller 400 through the connection circuit pattern 270 formed on the board device 200. As described above, the connection circuit pattern 270 is formed, as a circuit pattern is formed by using a copper plate on the board. Accordingly, the connection circuit pattern 270 may be easily formed on the bending device 250 (see FIG. 2).

Meanwhile, referring to FIG. 1, the plurality of light sources 310 are connected to each other in series, and the plurality of control devices 410 may be connected to the plurality of light sources 310, respectively, in parallel to bypass the current flowing through the light source 310. A marked part (hatched part) as in illustrated in FIG. 1 indicates the flow of a current. In other words, FIG. 1 illustrates that the current flowing through the light source (LED) 310 is bypassed by the control device 410, such that the light sources 310 are individually turned on/turned off.

For example, the light source controller 400 may include a supply source to supply a current to the light source 310 and the plurality of control devices 410 electrically connected to each of the plurality of light sources 310. In this case, the control device 410 may bypass the current to control the plurality of light sources 310 to be individually turned on/off. For example, the control device 410 may include a field effect transistor (FET) to bypass a current flowing through the light source 310 by a switching operation. However, the control device 410 is not limited thereto.

Meanwhile, referring to FIG. 3, the plurality of bending devices 250 may be provided at edges of the first mounting part 210, and a plurality of second mounting portions 230 may be provided to correspond to the plurality of bending devices 250. In addition, a plurality of light source controllers 400 may be provided to correspond to the plurality of second mounting parts 230 so that the plurality of control devices 410 are distributed and mounted on the plurality of second mounting parts 230.

In detail, the board device 200 may be formed in the structure in which the plurality of second mounting parts 230 are provided above on the first mounting part 210. In this case, the plurality of second mounting parts 230 may extend from the edge of the first mounting part 210 and may be spaced apart from each other.

As described above, the plurality of second mounting parts 230 are appropriately distributed around the first mounting part 210, thereby preventing the connection circuit pattern 270, which is to connect the light source 310 to the control device 410, from being twisted. In detail, as the number of the light sources (LED) 310 and the number of integrated circuits mounted are increased, the plurality of connection circuit patterns 270 to connect the light sources 310 to the integrated circuits are twisted. Accordingly, all integrated circuits may not be mounted on one second mounting part 230. According to an embodiment of the present disclosure, as the plurality of second mounting parts 230 are provided around one first mounting part 210, the integrated circuits may be properly distributed and mounted.

For example, referring to FIG. 3, the second mounting part 230 may include second up-down mounting parts 231 bent and extending from an upper end portion and a lower end portion of the first mounting part 210, and second left-right mounting parts 232 bent and extending from side end portions of the first mounting part 210. In other words, the board device 200 may include two second up-down mounting parts 231 and two second left-right mounting parts 232 around the first mounting part 210. In this case, the up-down direction, and the left-right direction are determined based on a direction when the first mounting part 210 is viewed from right.

In addition, the light source controller 400 may include a first light source controller 401 mounted on the second up-down mounting part 231 and electrically connected to the light source device 300, and a second light source controller 402 mounted on the second left-right mounting devices 232 and electrically connected to the light source device 300.

In this case, the bending device 250 may include a first bending device 251 to connect the first mounting part 210 and the second up-down mounting part 231, and a second bending part 252 to connect the first mounting part 210 to the second left-right mounting part 232. In addition, the connection circuit pattern 270 may include a first pattern 271 to connect some light sources 310 to a first control device 411 of the first light source controller 401, and a second pattern 272 to connect remaining light sources 310 to a second control device 412 of the second light source controller 402. In addition, according to another embodiment of the present disclosure, a first shielding cover 510 to cover the first light source controller 401 and a second shielding cover 520 to cover the second light source controller 402 may be included.

As described above, according to another embodiment of the present disclosure, the connection circuit pattern 270 is divided into the first pattern 271 and the second pattern 272 for realizing. Accordingly, the connection circuit pattern 270 may be prevented from being twisted even when the number of integrated circuits (IC) and the light sources 310, which are mounted, is increased.

Meanwhile, the first mounting part 210 may include a metal material. For example, the first mounting part 210 may include a metal such as aluminum (Al) or copper (Cu). Accordingly, the first mounting part 210 may have excellent heat dissipation performance, thereby minimizing the transfer of heat generated from the light source device 300 to the light source controller 400. However, metal constituting the first mounting part 210 is not limited to the above metal.

The second mounting part 230 may include a glass fiber material. For example, the second mounting part 230 may include an FR-4 material formed by stacking glass fibers impregnated with epoxy resins in several layers. The FR-4 material may exhibit excellent price-performance to reduce cost, and may make it easy to form a multiple structure. However, the glass fiber material included in the second mounting part 230 is not limited to the FR-4 material, and various materials including glass fiber may be applied. In addition, the second mounting part 230 is not limited to a case of including glass fiber material, and may be modified with various materials depending on the configuration of the light source controller 400.

The second mounting part 230 may include a metal material. In other words, when the number of integrated circuits ICs constituting the light source controller 400 is increased, even the second mounting part 230 may include a metal material for heat dissipation of the integrated circuit. In this case, metals, such as aluminum and copper, which are advantageous to heat dissipation, may be variously applied to the metal material. In addition, various materials may be applied to the second mounting part 230 in addition to materials including a metal material and a glass fiber.

Meanwhile, referring to FIG. 4, the vehicle lamp 100 according to another embodiment of the present disclosure may further include a heat sink device 610 and a cooling fan 620.

The heat sink device 610 may be provided to make contact with the first mounting part 210 and the second mounting part 230, and may be provided to receive heat from the first mounting part 210 and the second mounting part 230. In addition, the cooling fan 620 may be installed on one side of the heat sink device 610 and may be provided to cool the heat sink device 610 by forming a flow of air.

In detail, according to another embodiment of the present disclosure, the vehicle lamp 100 may be provided such that the first mounting part 210 having the light source device 300 mounted thereon and the second mounting part 230 having the light source controller 400 mounted thereon may share one heat sink device 610. In other words, according to the present disclosure, the vehicle lamp 100 may be provided to dissipate heat from all the light source device 300 and the light source controller 400 by using one heat sink device 610. In addition, the cooling fan 620 is mounted at one side of the heat sink device 610 to additionally dissipate heat.

Therefore, according to the present disclosure, the whole size of the heat sink device 610 may be reduced, as compared to that heat sinks are individually mounted in the conventional light source device 300 and the conventional light source controller 400.

In this case, the cooling fan 620 may be mounted on a surface, which does not make contact with the board device 200, of one side surface of the heat sink device 610. For example, referring to FIG. 4, the cooling fan 620 may be mounted on a surface, which faces a direction opposite to the direction of the first mounting part 210, of the heat sink device 610.

In detail, the cooling fan 620 are mounted on a surface which is not in contact with the first mounting part 210 and the second mounting part 230, and may be coaxially aligned together with the first mounting part 210 and the heat sink device 610.

As described above, as the cooling fan 620, the heat sink device 610, and the first mounting part 210 are aligned in line with each other, the heat from the first mounting part 210 may be more effectively dissipated. Since the plurality of light sources 310 are provided in the first mounting part 210, the first mounting part 210 may emit a larger amount of heat that that of the second mounting part 230. Accordingly, as the cooling fan 620 is disposed to be more advantageous to the heat dissipation of the first mounting part 210. Accordingly, when one heat sink device 610 and one cooling fan 620 are provided, the board device 200 may be more effectively dissipate heat.

As described above, according to an embodiment of the present disclosure, the vehicle lamp includes the first mounting part and the second mounting part forming a specific angle on the board device by the bending device formed on the board device, thereby minimizing the interface between the area for mounting the light source device and the area for mounting the light source controller.

Therefore, according to an embodiment of the present disclosure, the integral-board form is maintained in which the light source device and the light source controller are mounted on one board, and the light source device is spaced apart from the light source controller. Accordingly, the member necessary for shielding may be mounted on the second mounting part, thereby improving the EMC.

In addition, according to an embodiment of the present disclosure, the light source device and the light source controller may be spaced apart from each other to solve the problem of transferring heat from the light source to the light source controller.

In addition, according to an embodiment of the present disclosure, since additional equipment is not required for the EMC and for blocking heat, the slim vehicle lamp may be realized.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A lamp for a vehicle comprising:
- a board device including a first mounting part and a plurality of second mounting parts bent and extending from the first mounting part;
- a light source device mounted on the first mounting part and including a plurality of light sources; and
- a plurality of light source controllers corresponding to the plurality of second mounting parts such that each light source controller is mounted on a respective second mounting part and is electrically connected to the plurality of light sources to control a current flowing through the plurality of light sources, wherein a first group of control devices is distributed and mounted on a first second mounting part of the plurality of second mounting parts and a second group of control devices is distributed and mounted on a second second mounting part of the plurality of second mounting parts, and the first and second groups of control devices are each connected to the plurality of light sources in parallel, respectively, to bypass currents flowing through the plurality of light sources, wherein the board device further comprises:
- a plurality of bent parts provided at an edge of the first mounting part, each bent part formed at a portion at which the first mounting part and a respective second mounting part meet each other, each being bent such that a specific angle is formed between the first bending part and the respective second mounting part.

2. The lamp of claim 1, wherein the first mounting part, the plurality of second mounting parts, and the plurality of bent parts are integrally formed.

3. The lamp of claim 1, wherein the board device further comprises:
- a connection circuit pattern in each of the plurality of bent parts and provided to electrically connect the plurality of light sources to the plurality of control devices provided in the light source controller.

4. The lamp of claim 3, wherein:
- the plurality of light sources are connected to each other in series.

5. The lamp of claim 1, further comprising:
- a shielding cover mounted on at least one of the plurality of second mounting parts to cover the light source controller and being adapted to shield an electromagnetic wave.

6. The lamp of claim 1, wherein each of the plurality of second mounting parts comprise:
- up-down mounting parts bent and extending from an upper end portion and a lower end portion of the first mounting part; and
- left-right mounting parts bent and extending from side end portions of the first mounting part, wherein the plurality of light source controllers comprise:
- a first light source controller mounted on the up-down mounting parts and being electrically connected to the light source device; and
- a second light source controller mounted on the left-right mounting parts.

7. The lamp of claim 1, wherein the first mounting part includes a metal material.

8. The lamp of claim 1, wherein the plurality of second mounting parts comprise a glass fiber material.

9. The lamp of claim 1, wherein the plurality of second mounting parts comprise a metal material.

10. The lamp of claim 1, further comprising:

a heat sink device adapted to make contact with the first mounting part and the plurality of second mounting parts and to receive heat from the first mounting part and the plurality of second mounting parts; and a cooling fan mounted at one side of the heat sink device to form a flow of air and to cool the heat sink device.

11. The lamp of claim 10, wherein the cooling fan is mounted on a surface of the heat sink device facing a direction opposite to a direction of the first mounting part.

* * * * *